US012779341B2

(12) United States Patent
Morimura et al.

(10) Patent No.: US 12,779,341 B2
(45) Date of Patent: Nov. 3, 2026

(54) NON-TRANSITORY STORAGE MEDIUM ENCODED WITH COMPUTER READABLE GAME PROGRAM, GAME SYSTEM, INFORMATION PROCESSING APPARATUS, AND INFORMATION PROCESSING METHOD THAT ALLOW EXECUTION OF ONLINE MISSION WITH USE OF DATA IN GAME

(71) Applicant: NINTENDO CO., LTD., Kyoto (JP)

(72) Inventors: Naoya Morimura, Kyoto (JP); Jean-Francois Vidal, Paris (FR); Laurent Hiriart, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 303 days.

(21) Appl. No.: 18/209,647

(22) Filed: Jun. 14, 2023

(65) Prior Publication Data

US 2024/0173627 A1 May 30, 2024

(30) Foreign Application Priority Data

Nov. 24, 2022 (JP) ................................ 2022-187150

(51) Int. Cl.
*A63F 13/537* (2014.01)
*A63F 13/77* (2014.01)
(Continued)

(52) U.S. Cl.
CPC ............ *A63F 13/77* (2014.09); *A63F 13/537* (2014.09); *A63F 13/46* (2014.09); *A63F 13/533* (2014.09); *A63F 13/69* (2014.09)

(58) Field of Classification Search
None
See application file for complete search history.

(56) References Cited

U.S. PATENT DOCUMENTS

2012/0015748 A1* 1/2012 Osada .................... A63F 13/12 463/43
2013/0172086 A1 7/2013 Ikenaga
(Continued)

FOREIGN PATENT DOCUMENTS

JP 2001340641 A 12/2001
JP 2012065831 A 4/2012
(Continued)

OTHER PUBLICATIONS

Jonael, “Perfect Dark Online Part 2 (Fun edition)”, N64 Perfect Dark Laboratory , May 6, 2020, Retrieved on Nov. 25, 2025, http://pdlabo.knowhow.jp/emulator/pd-online/playing/.
(Continued)

*Primary Examiner* — Damon J Pierce
(74) *Attorney, Agent, or Firm* — Scully, Scott, Murphy & Presser, P.C.

(57) ABSTRACT

A non-transitory storage medium encoded with a computer readable game program executed by a computer of an information processing apparatus, at least one computer being configured to perform operations including causing an emulator to execute a game program, monitoring a prescribed address in a memory area used as a result of execution of the game program by the emulator, the prescribed address changing in value on the occurrence of a prescribed event in a game, determining a status of accomplishment of an objective set in advance based on transition of the value at the prescribed address in the game, transmitting the status of accomplishment of the objective to a server provided to communicate over a network, and receiving from the server, information on a status of accomplishment of an online mission, the status being determined based on the status of accomplishment of the objective transmitted by a plurality of players.

24 Claims, 15 Drawing Sheets

(51) Int. Cl.

| | |
|---|---|
| *A63F 13/46* | (2014.01) |
| *A63F 13/533* | (2014.01) |
| *A63F 13/69* | (2014.01) |

(56) References Cited

U.S. PATENT DOCUMENTS

| | | | |
|---|---|---|---|
| 2021/0252409 | A1 | 8/2021 | Lee |
| 2021/0275920 | A1 | 9/2021 | Yoshimoto et al. |

FOREIGN PATENT DOCUMENTS

| | | | |
|---|---|---|---|
| JP | 2012085876 | A | 5/2012 |
| JP | 4995856 | B2 | 8/2012 |
| JP | 2021128772 | A | 9/2021 |
| JP | 2021137277 | A | 9/2021 |
| JP | 7170006 | B2 | 11/2022 |

OTHER PUBLICATIONS

Rainheart, “We will do the 1st World Count Challenge! [Super Mario Bros. 35]”, YouTube , Jan. 25, 2021, Retrieved on Nov. 25, 2025, https://www.youtube.com/watch?v=MNiSLWOYUpY.

Decision to Grant dated Dec. 2, 2025 received in Japanese Patent Application No. 2022-187150.

* cited by examiner

FIG.15

| APPARATUS ID | COUNTRY ID | THE NUMBER OF TIMES (Kicks) | RANKING (rank) |
|---|---|---|---|
| AAA | JP | 7520 | 20 |
| BBB | JP | 2000 | 200 |
| CCC | JP | 4000 | 160 |
| ⋮ | ⋮ | ⋮ | ⋮ |
| JP | | 102939 | |
| World | | 1929802939 | |

NON-TRANSITORY STORAGE MEDIUM ENCODED WITH COMPUTER READABLE GAME PROGRAM, GAME SYSTEM, INFORMATION PROCESSING APPARATUS, AND INFORMATION PROCESSING METHOD THAT ALLOW EXECUTION OF ONLINE MISSION WITH USE OF DATA IN GAME

This nonprovisional application claims priority on Japanese Patent Application No. 2022-187150 filed on Nov. 24, 2022 with the Japan Patent Office, the entire contents of which are hereby incorporated by reference.

FIELD

The present disclosure relates to a game program and particularly to execution of an online mission.

An information processing apparatus in which an emulator program and ROM data of a game are stored has conventionally been known. In this apparatus, an operation of a game device sold in the past can be reproduced by the emulator program and an installed game can be played.

For the information processing apparatus as above, however, execution of an online mission with the use of data in a game has not been taken into consideration. Without provision of an online mission in an original game, it has been difficult to carry out an online mission in execution of the game by an emulator.

An object of the present disclosure is to provide a non-transitory storage medium encoded with a computer readable game program, a game system, an information processing apparatus, and an information processing method that allow execution of an online mission with the use of data in a game.

A non-transitory storage medium encoded with a computer readable game program executable by a computer of an information processing apparatus according to one example of the present disclosure, when executed by the computer, the computer readable game program causes the computer to perform operations including causing an emulator to execute a game program, monitoring a prescribed address in a memory area used as a result of execution of the game program by the emulator, the prescribed address changing in value on the occurrence of a prescribed event in a game, determining a status of accomplishment of an objective set in advance based on transition of the value at the prescribed address in the game, transmitting the status of accomplishment of the objective to a server provided to communicate over a network, and receiving from the server, information on a status of accomplishment of an online mission, the status being determined based on the status of accomplishment of the objective transmitted by a plurality of players. According to this configuration, the status of accomplishment of the objective can be determined based on transition of the value at the prescribed address in the game, the prescribed address changing in value on the occurrence of a prescribed event in the game, and the status of accomplishment of the objective is transmitted to the server. Therefore, an online mission can be executed with the use of data in the game.

In the exemplary embodiment, the status of accomplishment of the objective is determined based on at least one of presence/absence of change during the game, the number of times of change, a value at prescribed timing, and a cumulative sum over a prescribed period, of the value at the prescribed address. According to this configuration, the status of accomplishment of the objective can be determined based on at least one of presence/absence of change during the game, the number of times of change, the value at prescribed timing, and the cumulative sum over the prescribed period, of the value at the prescribed address that changes on the occurrence of a prescribed event in the game, and the status of accomplishment of the objective is transmitted to the server. Therefore, an online mission can be executed with further use of data in the game.

In the exemplary embodiment, the value at the prescribed address is reset or changes again in accordance with progress of the game. According to this configuration, the online mission can be executed with the use of data which is the value that is reset or changes again in accordance with progress of the game in the game.

In the exemplary embodiment, the value at the prescribed address changes when a player character performs a prescribed action in the game. According to this configuration, the online mission can be executed with the use of data which is the value that changes when a player character performs a prescribed action in the game.

In the exemplary embodiment, the game program further causes the computer to generate and output a game screen resulting from superimposition of information on the status of accomplishment of the objective on a game image based on execution of the game program by the emulator when the value at the prescribed address changes. According to this configuration, the online mission with great zest can be executed with the use of data in the game as the game screen on which information on the status of accomplishment of the objective is superimposed is outputted.

In the exemplary embodiment, the game program further causes the computer to generate and output a game screen resulting from combination of a game image based on execution of the game program by the emulator and an image showing the status of accomplishment of the online mission obtained from the server. According to this configuration, the online mission with great zest can be executed with the use of data in the game as the game screen combined with the image showing the status of accomplishment of the online mission obtained from the server is outputted.

A game system according to an example of the present disclosure includes a plurality of information processing apparatuses and a server provided to communicate with the plurality of information processing apparatuses over a network. Each of the plurality of information processing apparatuses includes a computer. The computer executes a game program by means of an emulator, monitors a prescribed address in a memory area used as a result of execution of the game program by the emulator, the prescribed address changing in value on the occurrence of a prescribed event in a game, determines a status of accomplishment of an objective set in advance based on transition of the value at the prescribed address, and transmits the status of accomplishment to the server. The server makes determination as to accomplishment of an online mission set for the plurality of information processing apparatuses based on the status of accomplishment of the objective transmitted from the plurality of information processing apparatuses, and transmits to the plurality of information processing apparatuses, information on a status of accomplishment of the online mission based on a result of determination. According to this configuration, the status of accomplishment of the objective can be determined based on transition of the value at the prescribed address in the game, the prescribed address changing in value on the occurrence of a prescribed event in the game, and the status of accomplishment of the objective is transmitted to the server. Therefore, an online mission can be executed with the use of data in the game.

In the exemplary embodiment, the status of accomplishment of the objective is determined based on at least one of presence/absence of change during the game, the number of times of change, a value at prescribed timing, and a cumulative sum over a prescribed period, of the value at the prescribed address. According to this configuration, the status of accomplishment of the objective can be determined based on at least one of presence/absence of change during the game, the number of times of change, the value at prescribed timing, and the cumulative sum over the prescribed period, of the value at the prescribed address that changes on the occurrence of a prescribed event in the game, and the status of accomplishment of the objective is transmitted to the server. Therefore, an online mission can be executed with further use of data in the game.

In the exemplary embodiment, the value at the prescribed address is reset or changes again in accordance with progress of the game. According to this configuration, the online mission can be executed with the use of data which is the value that is reset or changes again in accordance with progress of the game in the game.

In the exemplary embodiment, the value at the prescribed address changes when a player character performs a prescribed action in the game. According to this configuration, the online mission can be executed with the use of data which is the value that changes when a player character performs a prescribed action in the game.

In the exemplary embodiment, the computer further generates and outputs a game screen resulting from superimposition of information on the status of accomplishment of the objective on a game image based on execution of the game program by the emulator when the value at the prescribed address changes. According to this configuration, the online mission with great zest can be executed with the use of data in the game as the game screen on which information on the status of accomplishment of the objective is superimposed is outputted.

In the exemplary embodiment, the computer further generates and outputs a game screen resulting from combination of a game image based on execution of the game program by the emulator and an image showing the status of accomplishment of the online mission obtained from the server. According to this configuration, the online mission with great zest can be executed with the use of data in the game as the game screen combined with the image showing the status of accomplishment of the online mission obtained from the server is outputted.

An information processing apparatus according to an example of the present disclosure includes a computer and a memory. The computer executes a game program by means of an emulator, monitors a prescribed address in a memory area used as a result of execution of the game program by the emulator, the prescribed address changing in value on the occurrence of a prescribed event in a game, determines a status of accomplishment of an objective set in advance based on transition of the value at the prescribed address in the game, transmits the status of accomplishment to a server provided to communicate over a network, and receives from the server, information on a status of accomplishment of an online mission, the status being determined based on the status of accomplishment of the objective transmitted by a plurality of players. According to this configuration, the status of accomplishment of the objective can be determined based on transition of the value at the prescribed address in the game, the prescribed address changing in value on the occurrence of a prescribed event in the game, and the status of accomplishment of the objective is transmitted to the server. Therefore, an online mission can be executed with the use of data in the game.

In the exemplary embodiment, the status of accomplishment of the objective is determined based on at least one of presence/absence of change during the game, the number of times of change, a value at prescribed timing, and a cumulative sum over a prescribed period, of the value at the prescribed address. According to this configuration, the status of accomplishment of the objective can be determined based on at least one of presence/absence of change during the game, the number of times of change, the value at prescribed timing, and the cumulative sum over the prescribed period, of the value at the prescribed address that changes on the occurrence of a prescribed event in the game, and the status of accomplishment of the objective is transmitted to the server. Therefore, an online mission can be executed with further use of data in the game.

In the exemplary embodiment, the value at the prescribed address is reset or changes again in accordance with progress of the game. According to this configuration, the online mission can be executed with the use of data which is the value that is reset or changes again in accordance with progress of the game in the game.

In the exemplary embodiment, the value at the prescribed address changes when a player character performs a prescribed action in the game. According to this configuration, the online mission can be executed with the use of data which is the value that changes when a player character performs a prescribed action in the game.

In the exemplary embodiment, the computer generates and outputs a game screen resulting from superimposition of information on the status of accomplishment of the objective on a game image based on execution of the game program by the emulator when the value at the prescribed address changes. According to this configuration, the online mission with great zest can be executed with the use of data in the game as the game screen on which information on the status of accomplishment of the objective is superimposed is outputted.

In the exemplary embodiment, the computer generates and outputs a game screen resulting from combination of a game image based on execution of the game program by the emulator and an image showing the status of accomplishment of the online mission obtained from the server. According to this configuration, the online mission with great zest can be executed with the use of data in the game as the game screen combined with the image showing the status of accomplishment of the online mission obtained from the server is outputted.

An information processing method according to an example of the present disclosure, includes executing by a processor of a game device, a game program by means of an emulator, monitoring a prescribed address in a memory area used as a result of execution of the game program by the emulator, the prescribed address changing in value on the occurrence of a prescribed event in a game, determining a status of accomplishment of an objective set in advance based on transition of the value at the prescribed address in the game, transmitting the status of accomplishment to a server provided to communicate over a network, and receiving from the server, information on a status of accomplishment of an online mission, the status being determined based on the status of accomplishment of the objective transmitted by a plurality of players. The monitoring, determining, transmitting and receiving are executed by the processor. According to this configuration, the status of accomplishment of the objective can be determined based on transition of the value at the prescribed address in the game, the prescribed address changing in value on the occurrence of a prescribed event in the game, and the status of accomplishment of the objective is transmitted to the server. Therefore, an online mission can be executed with the use of data in the game.

In the exemplary embodiment, the processor determines the status of accomplishment of the objective set in advance for the game, based on at least one of presence/absence of change during the game, the number of times of change, a value at prescribed timing, and a cumulative sum over a prescribed period, of the value at the prescribed address. According to this configuration, the status of accomplishment of the objective can be determined based on at least one of presence/absence of change during the game, the number of times of change, the value at prescribed timing, and the cumulative sum over the prescribed period, of the value at the prescribed address that changes on the occurrence of a prescribed event in the game, and the status of accomplishment of the objective is transmitted to the server. Therefore, an online mission can be executed with further use of data in the game.

In the exemplary embodiment, the value at the prescribed address is reset or changes again in accordance with progress of the game. According to this configuration, the online mission can be executed with the use of data which is the value that is reset or changes again in accordance with progress of the game in the game.

In the exemplary embodiment, the value at the prescribed address changes when a player character performs a prescribed action in the game. According to this configuration, the online mission can be executed with the use of data which is the value that changes when a player character performs a prescribed action in the game.

In the exemplary embodiment, the method further includes generating and outputting, by the processor, a game screen resulting from superimposition of information on the status of accomplishment of the objective on a game image based on execution of the game program by the emulator when the value at the prescribed address changes. According to this configuration, the online mission with great zest can be executed with the use of data in the game as the game screen on which information on the status of accomplishment of the objective is superimposed is outputted.

In the exemplary embodiment, the method further includes generating and outputting, by the processor, a game screen resulting from combination of a game image based on execution of the game program by the emulator and an image showing the status of accomplishment of the online mission obtained from the server. According to this configuration, the online mission with great zest can be executed with the use of data in the game as the game screen combined with the image showing the status of accomplishment of the online mission obtained from the server is outputted.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 15 shows an exemplary illustrative non-limiting drawing illustrating a summation table provided by a summation unit 302 of server 30 based on the embodiment.

DETAILED DESCRIPTION OF NON-LIMITING EXAMPLE EMBODIMENTS

Figure 1:
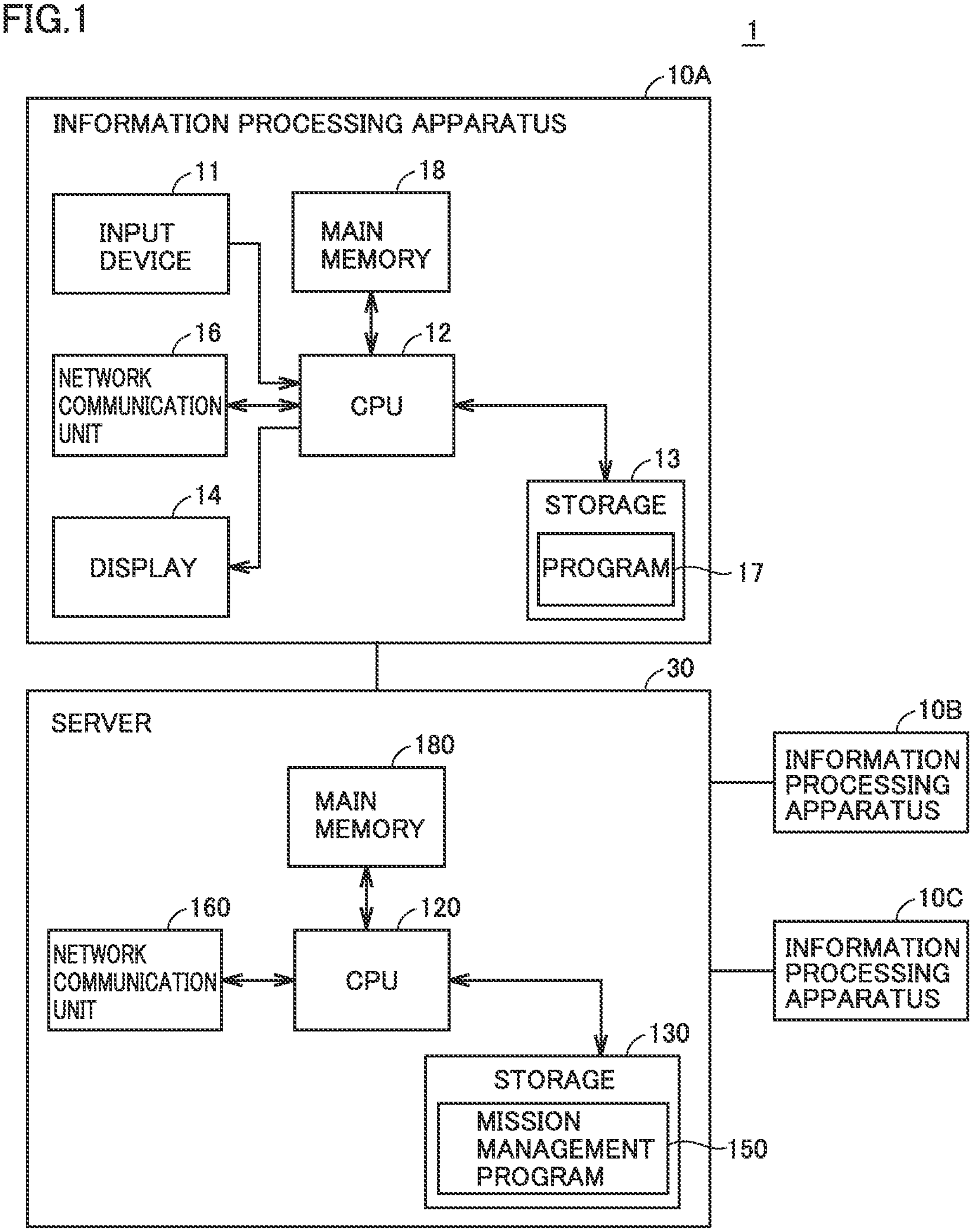
FIG. 1 shows an exemplary illustrative non-limiting drawing illustrating an overview of a configuration of an information processing system based on an embodiment.

This embodiment will be described in detail with reference to the drawings. The same or corresponding elements in the drawings have the same reference characters allotted and description thereof will not be repeated.

A. Configuration of Information Processing System

FIG. 1 is a diagram illustrating an overview of a configuration of an information processing system based on an embodiment.

A configuration in which an information processing system is implemented as a game system 1 will be described with reference to FIG. 1. Game system 1 includes a server 30 and a plurality of information processing apparatuses

10A to 10C (which will also collectively be referred to as an information processing apparatus 10 below) provided to communicate with server 30.

The plurality of information processing apparatuses 10A to 10C are identical to one another in configuration, and information processing apparatus 10A will mainly representatively be described in the present example. The number of information processing apparatuses is not limited, and a larger number of information processing apparatuses may be provided.

By way of example, a configuration in which information processing apparatus 10A based on the embodiment is implemented as a game device will be described.

Information processing apparatus 10A is any computer. Information processing apparatus 10A may be, for example, a portable (also referred to as mobile) device such as a portable game device, a portable telephone, or a smartphone, a stationary apparatus such as a personal computer or a home game console, or a large apparatus such as an arcade game machine for a commercial purpose.

A hardware configuration of information processing apparatus 10A is outlined below.

Information processing apparatus 10A includes a CPU 12 and a main memory 18. CPU 12 is an information processor that performs various types of information processing in information processing apparatus 10. CPU 12 performs the various types of information processing by using main memory 18.

Information processing apparatus 10A includes a storage 13. A program 17 executed in information processing apparatus 10A is stored in storage 13.

For example, a storage embedded in information processing apparatus 10A such as a hard disk or a memory, a storage medium attachable to and removable from information processing apparatus 10A such as an optical disc or a cartridge, or combination of a storage and a storage medium as such may be adopted as storage 13. In such a case, a game system representing an exemplary information processing system including information processing apparatus 10A and any storage medium may be configured.

Program 17 includes computer-readable instructions for performing information processing as will be described later. The program may also include a program that establishes data communication with server 30 and a program that establishes data communication with another information processing apparatus as a part of processing. Details of program 17 will be described later.

Information processing apparatus 10A includes an input device 11 that accepts an instruction from a user (player), such as an analog stick, a button, or a touch panel. Information processing apparatus 10A includes a display 14 that shows an image generated through information processing. Without being limited to the configuration, various input forms and representation forms can be adopted.

Information processing apparatus 10A includes a network communication unit 16. Network communication unit 16 may be connected to a not-shown network and may perform processing for data communication with an external apparatus (for example, server 30 or another information processing apparatus).

Information processing apparatus 10A may be implemented by a plurality of apparatuses. For example, information processing apparatus 10A may be implemented by a main body apparatus including CPU 12 and an apparatus including input device 11 and/or display 14, which are separate from each other. For example, in another embodiment, information processing apparatus 10A may be implemented by a main body apparatus and a terminal device including input device 11 and display 14, or by a main body apparatus and an operation apparatus including input device 11. Information processing apparatus 10A may employ a television as a display apparatus, without including display 14.

In another embodiment, at least some of information processing performed in information processing apparatus 10A may be performed as being distributed among a plurality of apparatuses that can communicate over a network (a wide range network and/or a local network). Specifically, server 30 may perform at least some of information processing performed by information processing apparatus 10.

A hardware configuration of server 30 will be outlined.

Server 30 includes a CPU 120 and a main memory 180. CPU 120 is an information processor that performs various types of information processing in server 30. CPU 120 performs the various types of information processing by using main memory 180.

Server 30 includes a storage 130. A mission management program 150 to be executed in server 30 is stored in storage 130.

For example, a storage embedded in server 30 such as a hard disk or a memory, a storage medium attachable to and removable from server 30 such as an optical disc or a cartridge, or combination of a storage and a storage medium as such may be adopted as storage 130. In such a case, a game system representing an exemplary information processing system including server 30 and any storage medium may be configured.

Mission management program 150 includes computer-readable instructions for performing information processing as will be described later. The mission management program may also include a program that establishes data communication with information processing apparatuses 10A to 10C and a program that establishes data communication with another information processing apparatus as a part of processing.

Server 30 includes a network communication unit 160. Network communication unit 160 may be connected to a not-shown network and may perform processing for data communication with information processing apparatuses 10A to 10C.

Server 30 may be implemented by a plurality of apparatuses. In another embodiment, at least some of information processing performed in server 30 may be performed as being distributed among a plurality of other servers that can communicate over a network (a wide range network and/or a local network).

B. Overview of Processing in Present Embodiment

An overview of processing assumed in the present embodiment will now be described. In the present embodiment, information processing apparatus 10A includes a plurality of operation modes. In the present example, by way of example, there are two operation modes which are specifically a "play alone" operation mode and a "mission play" operation mode.

Figure 2:
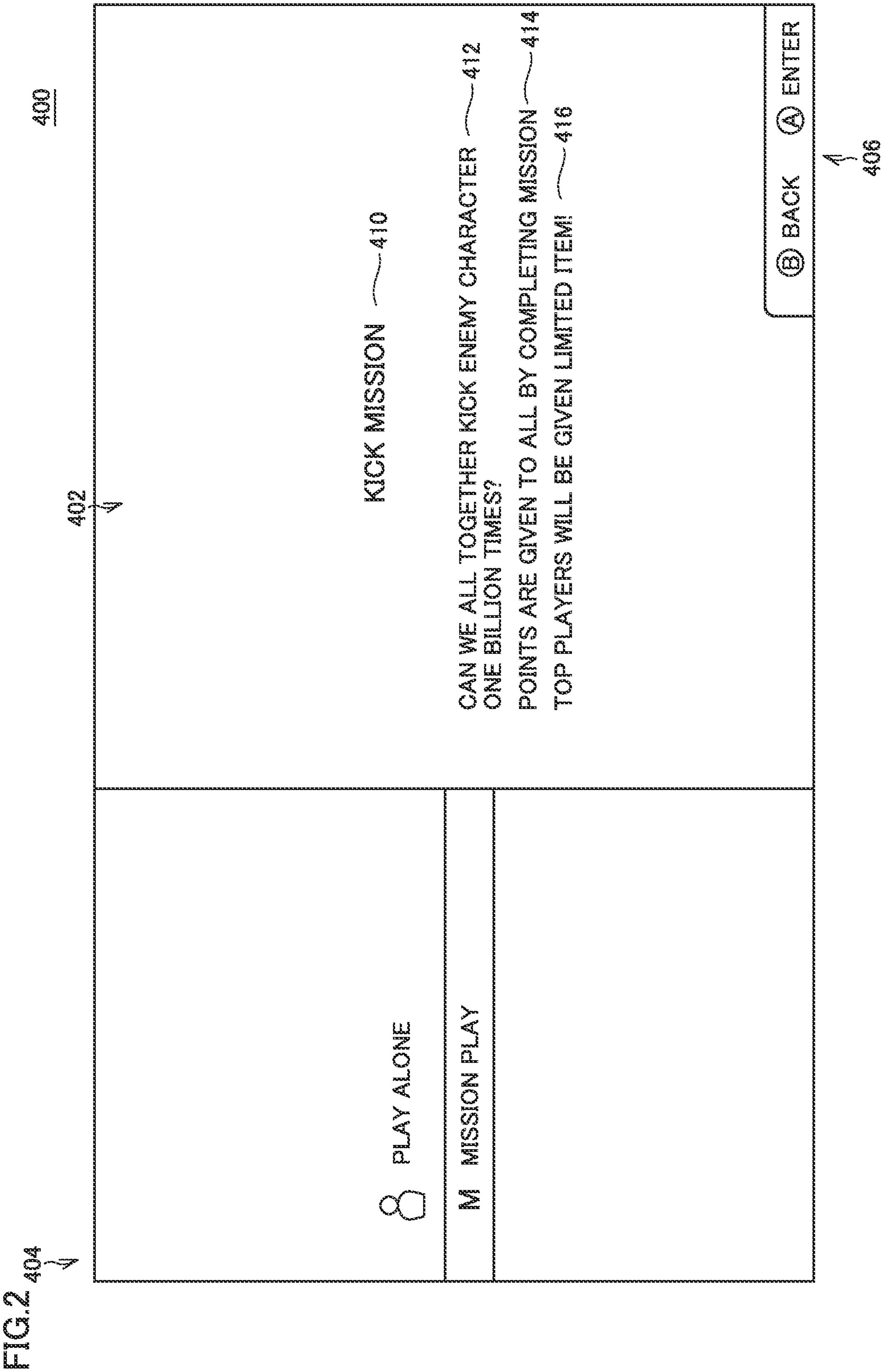
FIG. 2 shows an exemplary illustrative non-limiting drawing illustrating an exemplary menu screen 400 based on the embodiment.

FIG. 2 is a diagram illustrating an exemplary menu screen 400 based on the embodiment.

Referring to FIG. 2, menu screen 400 includes a menu area 402 and a menu operation reception area 404. In menu operation reception area 404, the "play alone" operation mode and the "mission play" operation mode are selectably provided.

In menu area 402, a message including contents of explanation of the operation mode selected in menu operation reception area 404 is shown. In the present example, a state in which the "mission play" operation mode is selected is shown, and messages 410 to 416 are shown as the contents of explanation of the "mission play" operation mode. Specifically, message 410 "kick mission" is shown as a title of the mission. Message 412 "can we all together kick enemy character one billion times?" is shown as contents of the kick mission. Message 414 "points are given to all by completing mission" is shown as information on a privilege to completion of the mission. Furthermore, message 416 "top players will be given limited item!" is shown as information on an additional privilege to completion of the mission.

An operation instruction image 406 is also shown under menu area 402. Operation instruction image 406 shows an operation to be performed by a user onto a group of operation buttons of input device 11 and corresponding processing contents. Specifically, as a specific operation button (corresponding to "A") in the group of operation buttons of input device 11 is operated, decision to perform processing shown in menu operation reception area 404 is made.

As a specific operation button (corresponding to "B") in the group of operation buttons of input device 11 is operated, a screen can return to a screen immediately preceding menu screen 400, although it is not shown.

[Play Alone Operation Mode]

There is an operation mode as the play alone operation mode (which will simply be called a first mode below) in which an emulator program is executed to emulate prescribed game processing performed by a prescribed game device. The prescribed game device is a game device different from information processing apparatus 10A, and in the present embodiment, a game device including an eight-bit CPU is assumed as an exemplary prescribed game device. This game device is called an emulation-target game console below. Information processing apparatus 10A assumed in the present embodiment is assumed to be higher in performance of a processor and performance in image processing (processing capability) than the emulation-target game console. Furthermore, the emulated game is called an emulation-target game in the description below. A jump action game in which a screen can be scrolled by processing on a 2D screen is assumed as an exemplary emulation-target game. The emulation-target game has originally been provided as a game cartridge for the emulation-target game console. In the present embodiment, data stored in this game cartridge is stored in storage 13 as game ROM data 173 which will be described later. As game ROM data 173 is read into the emulator program and a game program included in game ROM data 173 is executed (emulated), the emulation-target game is executed.

Figure 3:
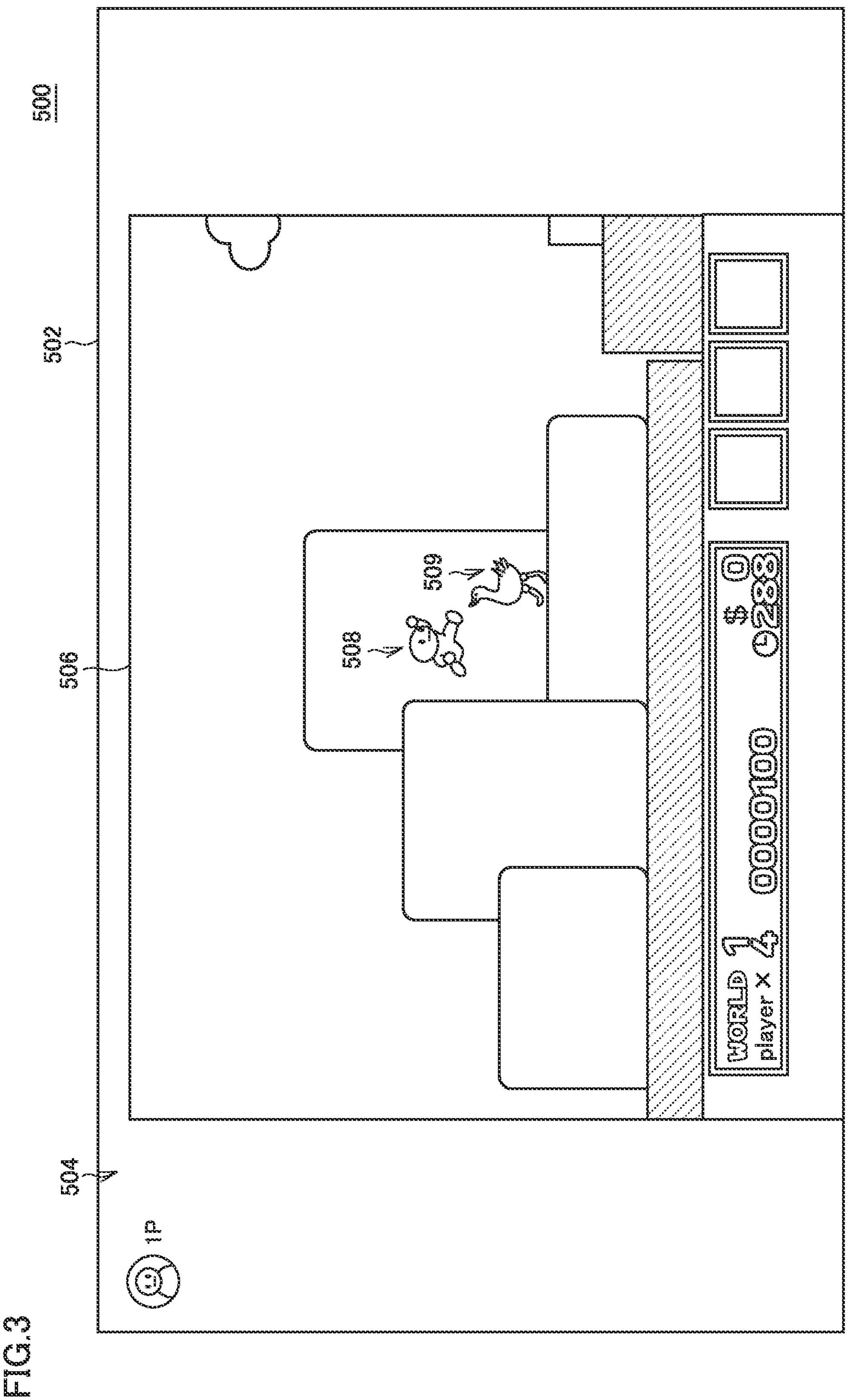
FIG. 3 shows an exemplary illustrative non-limiting drawing illustrating an overview of a game screen 500 in a first mode based on the embodiment.

FIG. 3 is a diagram illustrating an overview of a game screen 500 in the first mode based on the embodiment.

Referring to FIG. 3, game screen 500 is provided with a representation area 506 in the center for showing an emulation-target game. Game screen 500 is provided with a representation area 504 that can be used in another application, separately from representation area 506 for showing the emulation-target game. In the present example, by way of example, a player character 508, an enemy character 509, a background image, and the like are shown in representation area 506.

Enemy character 509 is located on a block. Player character 508 is shown as jumping above the block to kick and beat enemy character 509. A player operates a specific operation button (a cross-shaped key, an A button, a B button, or the like) of input device 11 to be able to move player character 508 to any position or have player character 508 jump. The game is a jump action game in which player character 508 is operated to move toward a goal point while avoiding various obstacles and kicking and beating enemy character 509.

[Mission Play Operation Mode]

The mission play operation mode (which is simply called a second mode below) will be described.

In the present embodiment, an online mission is provided to a player as the second mode, separately from prescribed game processing.

Figure 4:
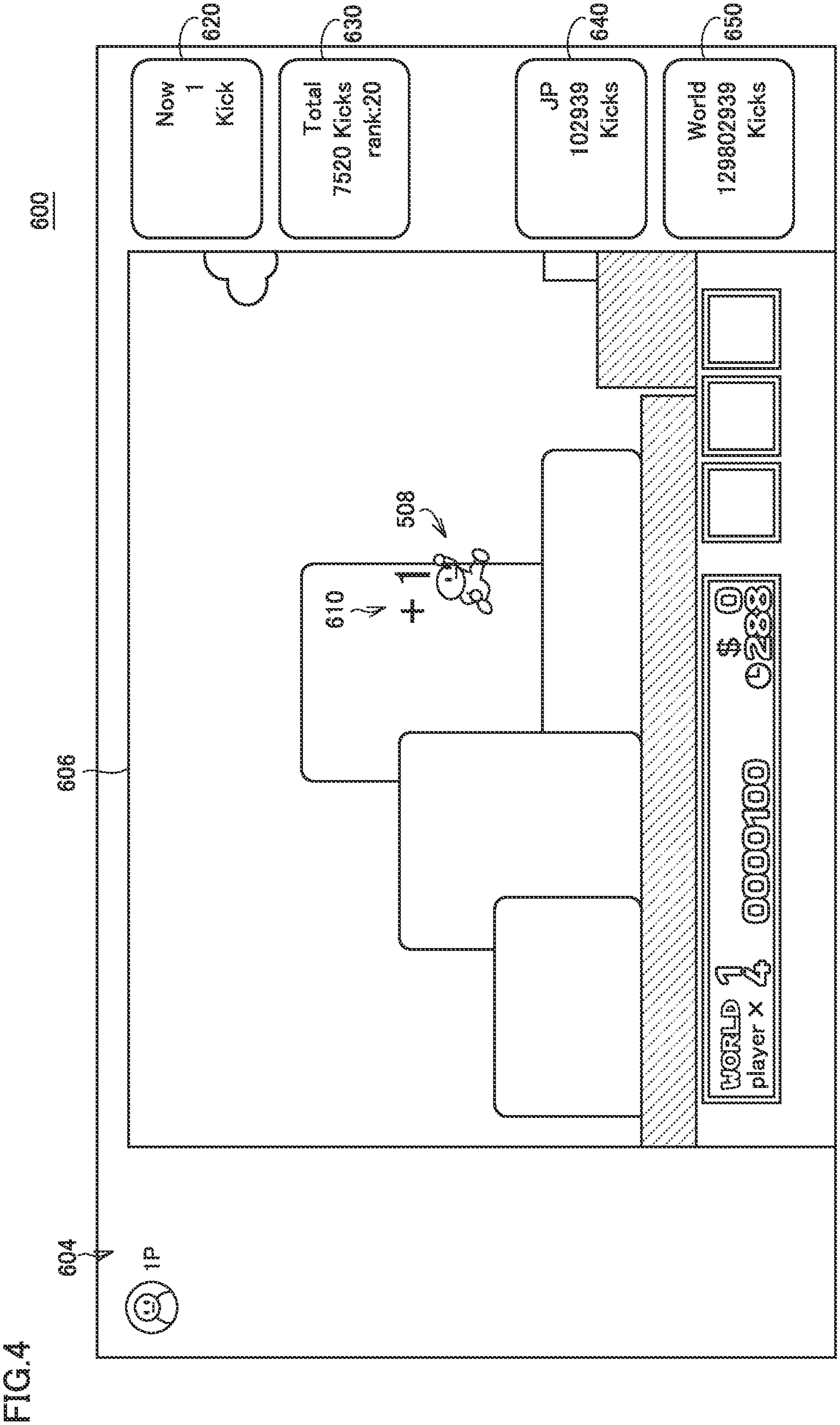
FIG. 4 shows an exemplary illustrative non-limiting drawing illustrating an overview of a game screen 600 in a second mode based on the embodiment.

The online mission in the present example refers to kicking of the enemy character one billion times in a joint effort of a plurality of players by way of example. Each player is on a mission to kick the enemy character in the game. The number of times of accomplishment of the mission by each player is counted, and when the total number of times of accomplishment of the mission reaches one billion, the overall mission, that is, the online mission, is accomplished. FIG. 4 is a diagram illustrating an overview of a game screen 600 in the second mode based on the embodiment.

Referring to FIG. 4, game screen 600 is provided with a representation area 606 in the center for showing the emulation-target game. Game screen 600 is provided with a representation area 604 that can be used in an online mission application, separately from representation area 606 for showing the emulation-target game. In the present example, by way of example, player character 508, the background image, and the like are shown in representation area 606.

A state in which player character 508 jumped above the block and kicked and beat enemy character 509 is shown. As enemy character 509 was beaten, enemy character 509 disappeared.

Information on a status of accomplishment of an objective which is the mission by kicking, the information in the present example being an image 610 showing "+1" which represents the number of times of kicking, is shown as being superimposed on a game image of the emulation-target game in representation area 606. The numerical value is incremented to "+2", "+3", and so on in accordance with the number of times of kicking of a plurality of enemy characters 509 at the same time.

In representation area 604 on the right of representation area 606, information indicating a status of accomplishment of the online mission is shown. Specifically, representation areas 620 to 650 for showing information indicating the status of accomplishment of the online mission are provided. Representation areas 620 to 650 are always shown in the area on the right of representation area 606 during the game until the online mission is accomplished, and messages are updated.

By way of example, in representation area 620, information on the status of accomplishment by a current player, of the objective which is the online mission, is shown. By way of example, the number of times of kicking is shown as 1.

In representation area 630, information on the status of accomplishment based on the total number of times, of the objective which is the online mission by the player is shown. By way of example, the number of times of kicking so far is shown as 7520. Ranking of the player in connection with the number of times of kicking is shown as 20.

In representation area 640, information on the status of accomplishment for each region based on the total number of times, of the objective which is the online mission is shown. By way of example, information on the status of accomplishment based on the total number of times, of the online mission by players all over Japan representing the region is shown. By way of example, the number of times of kicking by the players all over Japan is shown as 102939.

In representation area 650, information on the status of accomplishment of the mission all over the world based on the total number of times is shown. By way of example, the number of times of kicking by players all over the world is shown as 129802939.

Information in representation area 620 is shown based on data held in information processing apparatus 10A. Information in representation areas 630 to 650 is shown based on information processed and summed in server 30.

In the present example, as the second mode, information processing apparatus 10A determines the status of accomplishment of the objective set in advance which is the mission, that is, kicking of enemy character 509 by player character 508. Specifically, information processing apparatus 10A makes determination as to kicking of enemy character 509 by player character 508 based on transition of a value at a prescribed address in the game.

Information processing apparatus 10A transmits the status of accomplishment of the objective to server 30 provided to communicate over the network.

Server 30 collects data and determines whether or not the online mission has been accomplished based on the status of accomplishment of the objective transmitted by a plurality of players.

Server 30 generates information on the status of accomplishment of the online mission based on the collected data and transmits the information to information processing apparatus 10A.

Information processing apparatus 10A receives the information from server 30 and shows the information indicating the status of accomplishment of the online mission. The information processing apparatus repeats the processing until the online mission is accomplished.

Consequently, players all over the world can obtain an actual feeling of proceeding in real time with the mission in cooperation for accomplishing the online mission.

Figure 5:
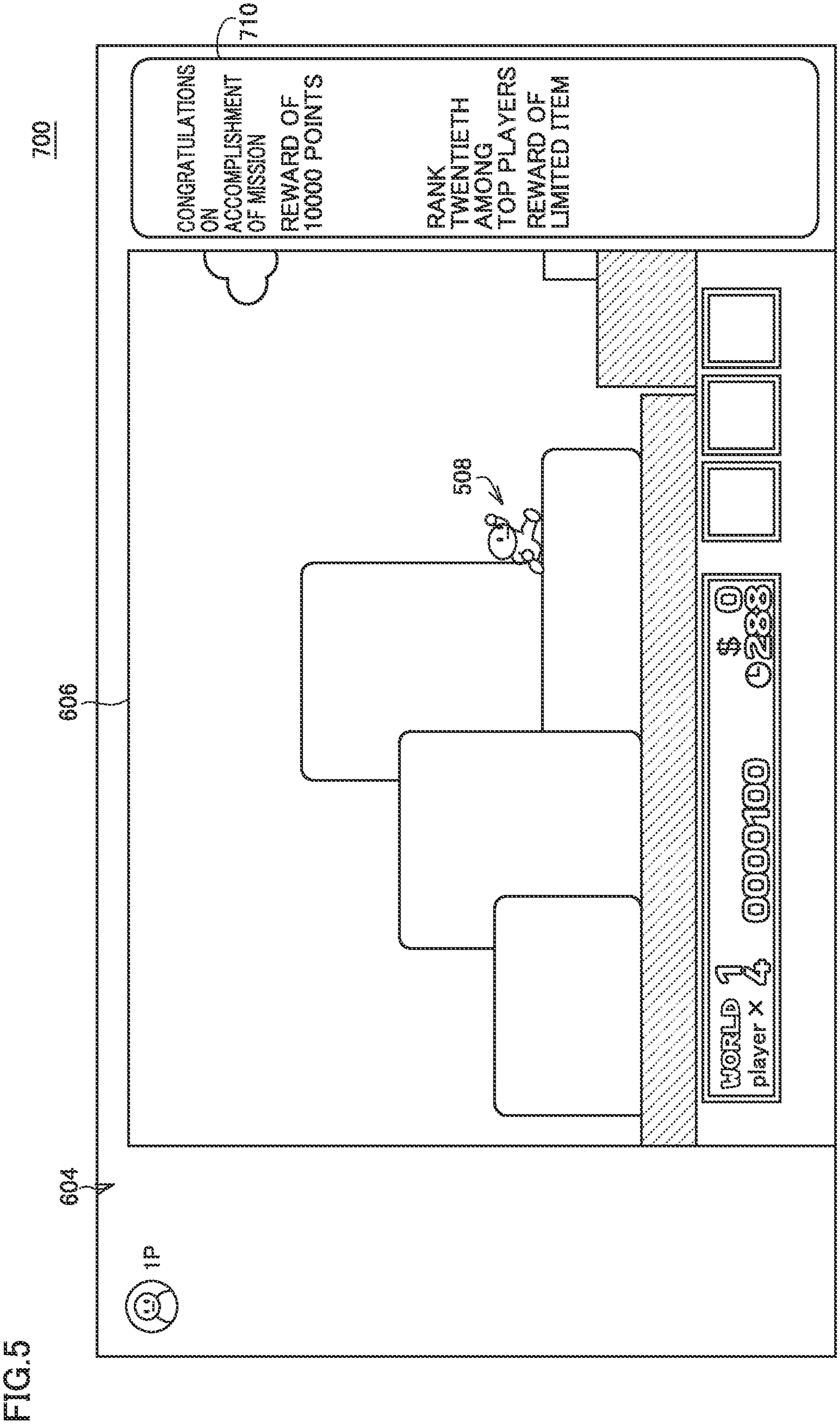
FIG. 5 shows an exemplary illustrative non-limiting drawing illustrating an overview of another game screen 700 in the second mode based on the embodiment.

FIG. 5 is a diagram illustrating an overview of another game screen 700 in the second mode based on the embodiment.

Referring to FIG. 5, game screen 700 is provided with representation area 606 in the center for showing the emulation-target game. Game screen 700 is provided with representation area 604 that can be used in an online mission application, separately from representation area 606 for showing the emulation-target game. In the present example, by way of example, player character 508, the background image, and the like are shown in representation area 606.

In representation area 604 on the right of representation area 606, information indicating the status of accomplishment of the online mission is shown. Specifically, a representation area 710 for showing information indicating the status of accomplishment of the online mission is provided.

In the present example, a screen at the time when the online mission is accomplished is shown. Specifically, by way of example, in representation area 710, a message "congratulations on accomplishment of mission," a message "reward of 10000 points," and a message "rank twentieth among top players" and "reward of limited item" are shown.

Information in representation area 710 is shown based on information processed and summed by server 30.

Accomplishment of the online mission can be known from generated information. Consequently, a privilege (points) can be provided to participating players. An additional privilege (limited item) can also be provided to top players.

C. Configuration of Program 17

Figure 6:
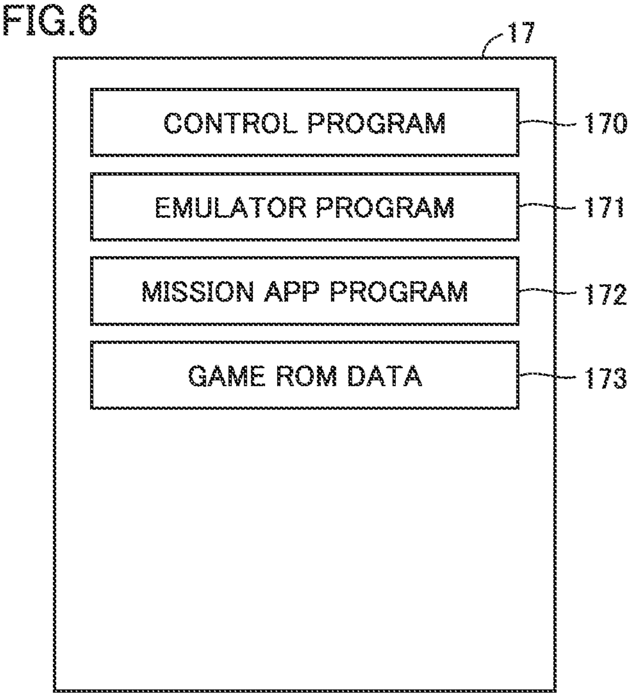
FIG. 6 shows an exemplary illustrative non-limiting drawing illustrating a program 17 stored in a storage 13 based on the embodiment.

FIG. 6 is a diagram illustrating program 17 stored in storage 13 based on the embodiment.

Referring to FIG. 6, program 17 includes a control program 170, an emulator program 171, a mission app program 172, and game ROM data 173.

Control program 170 is a program for controlling a basic operation of information processing apparatus 10A and it is a program for showing menu screen 400 described with reference to FIG. 2 and giving an instruction to execute the program in the first mode or the second mode.

Emulator program 171 is a program to emulate an operation of an emulation-target game console.

Mission app program 172 is a program to execute an online mission as the second mode.

Game ROM data 173 is ROM data of the emulation-target game.

D. Functional Configuration

Figure 7:
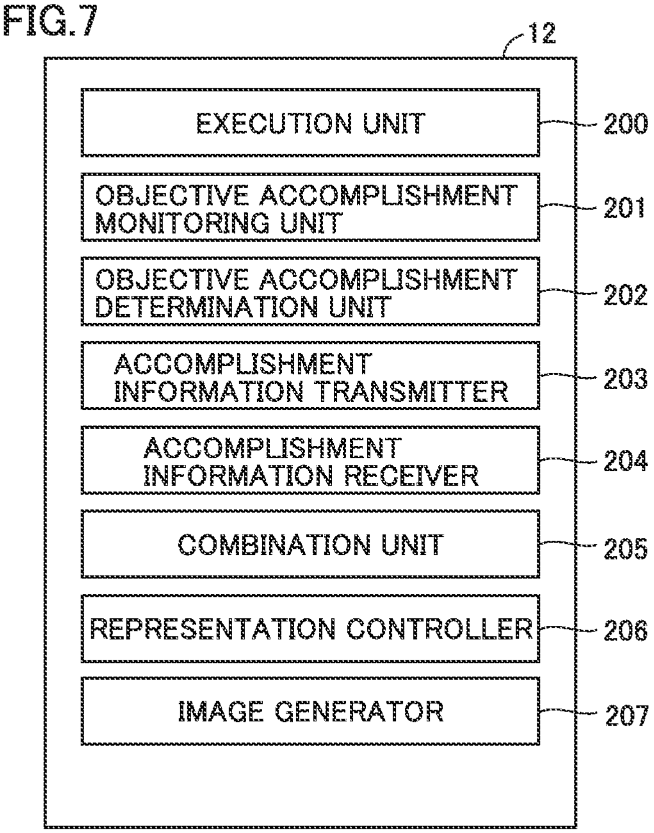
FIG. 7 shows an exemplary illustrative non-limiting drawing illustrating a functional block in the second mode, of an information processing apparatus 10A based on the embodiment.

FIG. 7 is a diagram illustrating a functional block in the second mode, of information processing apparatus 10A based on the embodiment.

Referring to FIG. 7, CPU 12 of information processing apparatus 10A implements various functional blocks by reading emulator program 171 and mission app program 172.

CPU 12 includes an execution unit 200, an objective accomplishment monitoring unit 201, an objective accomplishment determination unit 202, an accomplishment information transmitter 203, an accomplishment information receiver 204, a combination unit 205, a representation controller 206, and an image generator 207.

By way of example, emulator program 171 implements execution unit 200 and mission app program 172 implements objective accomplishment monitoring unit 201, objective accomplishment determination unit 202, accomplishment information transmitter 203, accomplishment information receiver 204, combination unit 205, representation controller 206, and image generator 207.

Execution unit 200 executes an emulation-target game with the use of game ROM data 173 stored in storage 13.

Objective accomplishment monitoring unit 201 monitors a prescribed address in a memory area used by execution unit 200, the prescribed address changing in value on the occurrence of a prescribed event in a game. Monitoring will be described later.

Objective accomplishment determination unit 202 determines the status of accomplishment of an objective set in advance based on transition of the value at the prescribed address in the game.

Accomplishment information transmitter 203 transmits the determined status of accomplishment of the objective to server 30 provided to communicate over the network.

Accomplishment information receiver 204 receives information on the status of accomplishment of an online mission, the status being determined based on the status of accomplishment of the objective transmitted by a plurality of players.

Image generator 207 generates an image showing information on the determined status of accomplishment of the objective. Image generator 207 generates an image showing the status of accomplishment of the online mission obtained from server 30.

Combination unit 205 generates a game screen resulting from superimposition of the image showing information on the determined status of accomplishment of the objective on a game image generated based on execution by execution unit 200. Combination unit 205 generates a game screen resulting from combination of a game image generated based on execution by execution unit 200 and an image showing the status of accomplishment of the online mission obtained from server 30.

Representation controller 206 has display 14 show the game screen generated by combination unit 205.

Figure 8:
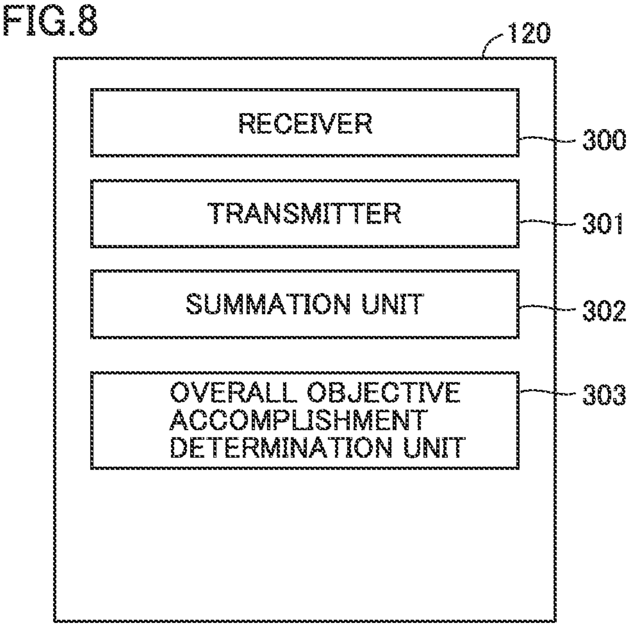
FIG. 8 shows an exemplary illustrative non-limiting drawing illustrating a functional block of a server 30 based on the embodiment.

FIG. 8 is a diagram illustrating a functional block of server 30 based on the embodiment.

Referring to FIG. 8, CPU 120 of server 30 implements various functional blocks by reading mission management program 150.

CPU 120 includes a receiver 300, a transmitter 301, a summation unit 302, and an overall objective accomplishment determination unit 303.

Receiver 300 receives the determined status of accomplishment of the objective transmitted from each information processing apparatus 10.

Summation unit 302 sums the determined status of accomplishment of the objective received by receiver 300.

Overall objective accomplishment determination unit 303 makes determination as to accomplishment of the online mission based on the status of accomplishment of the objective transmitted from a plurality of information processing apparatuses.

Transmitter 301 transmits to the plurality of information processing apparatuses, information on the status of accomplishment of the online mission based on a result of determination. Transmitter 301 transmits information on a privilege in accordance with the status of accomplishment, as information on the status of accomplishment of the online mission, based on the result of determination.

E. Processing Procedure

Details of processing based on the embodiment will now be described. Processing described here is exemplary general-purpose processing and different processing may be added as appropriate within the scope not departing from the gist of the embodiment.

[Processing in First Mode]

Figure 9:
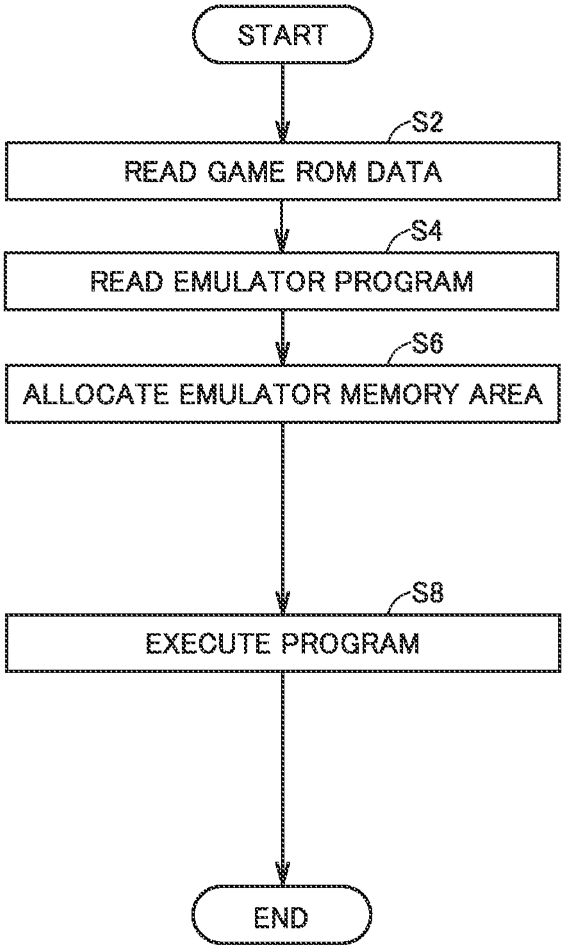
FIG. 9 shows an exemplary illustrative non-limiting flowchart illustrating a flow of processing in information processing apparatus 10A in the first mode based on the embodiment.

FIG. 9 is a flowchart illustrating a flow of processing in information processing apparatus 10A in the first mode based on the embodiment.

Referring to FIG. 9, CPU 12 reads game ROM data 173 stored in storage 13 (step S2). Specifically, the CPU has game ROM data 173 arranged in main memory 18.

CPU 12 then reads emulator program 171 stored in storage 13 (step S4). Specifically, the CPU has emulator program 171 arranged in main memory 18.

CPU 12 then allocates an emulator memory area to main memory 18 (step S6). Various pieces of data in the game are stored in the allocated emulator memory area.

CPU 12 then executes the program (step S8). Specifically, the emulation-target game is executed based on emulator program 171 and game ROM data 173 arranged in main memory 18.

Then, the process ends (end).

[Processing in Second Mode]

Figure 10:
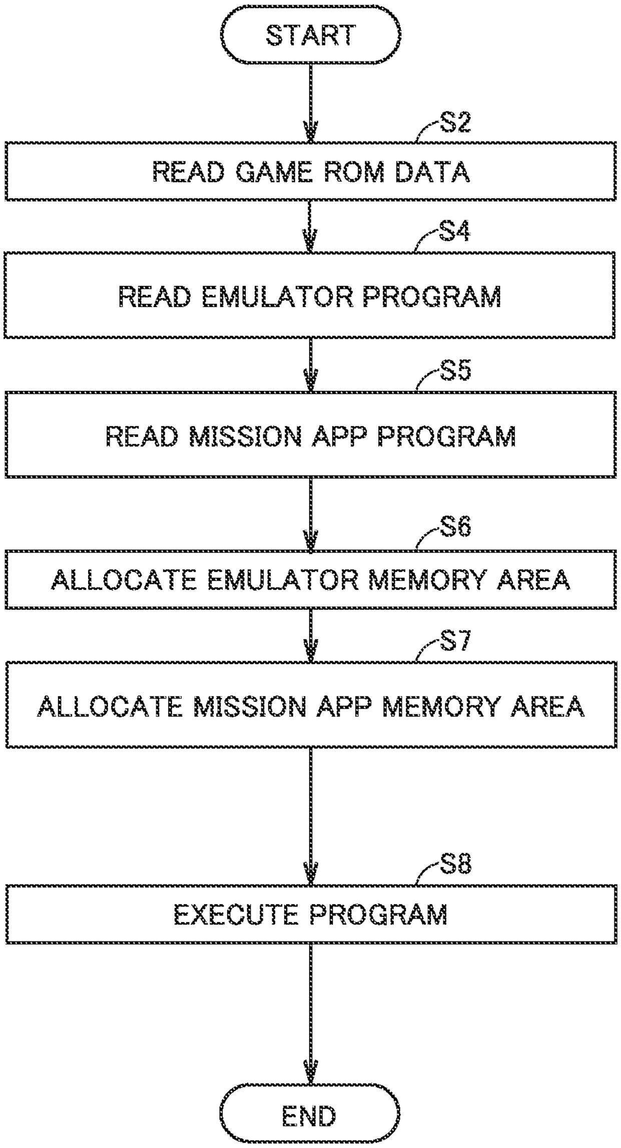
FIG. 10 shows an exemplary illustrative non-limiting flowchart illustrating a flow of processing in information processing apparatus 10A in the second mode based on the embodiment.

FIG. 10 is a flowchart illustrating a flow of processing in information processing apparatus 10A in the second mode based on the embodiment.

Referring to FIG. 10, differences from the flowchart in FIG. 9 reside in addition of step S5 and step S7.

Specifically, CPU 12 reads emulator program 171 in step S4, and thereafter reads mission app program 172 (step S5). Specifically, the CPU has mission app program 172 arranged in main memory 18.

CPU 12 allocates the emulator memory area to main memory 18 in step S6 and allocates a mission app memory area (step S7). Various pieces of data of the mission app program are stored in the allocated mission app memory area.

CPU 12 then executes the program (step S8). Specifically, CPU 12 executes the emulation-target game based on emulator program 171 and game ROM data 173 arranged in main memory 18. Furthermore, CPU 12 executes the online mission based on mission app program 172 arranged in main memory 18.

Then, the process ends (end).

Figure 11:
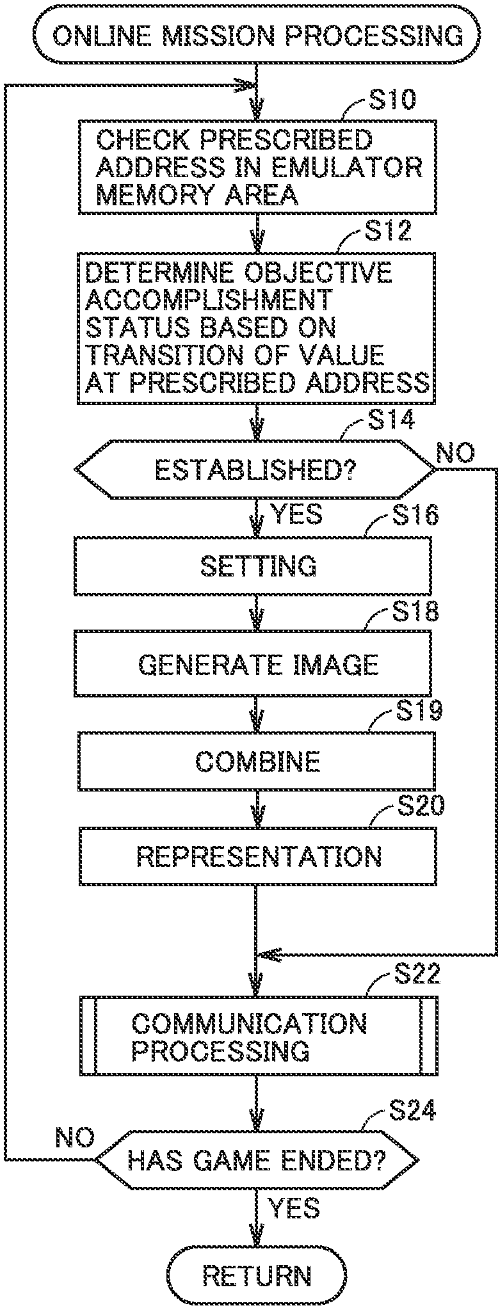
FIG. 11 shows an exemplary illustrative non-limiting flowchart illustrating online mission processing in information processing apparatus 10A in the second mode based on the embodiment.

FIG. 11 is a flowchart illustrating online mission processing in information processing apparatus 10A in the second mode based on the embodiment.

Referring to FIG. 11, objective accomplishment monitoring unit 201 checks a prescribed address in the emulator memory area (step S10). Objective accomplishment monitoring unit 201 notifies objective accomplishment determination unit 202 of a value at the checked prescribed address.

Objective accomplishment determination unit 202 then determines the status of accomplishment of the objective based on transition of the value at the prescribed address given from objective accomplishment monitoring unit 201 (step S12). A method of determining the status of accomplishment of the objective will be described later.

Objective accomplishment determination unit 202 then determines whether or not the status of accomplishment of the objective has been established (step S14).

When objective accomplishment determination unit 202 determines in step S14 that the status of accomplishment of the objective has been established (YES in step S14), it sets the status of accomplishment of the objective in the mission app memory area (step S16).

Image generator 207 then generates an image associated with the status of accomplishment of the objective set in the mission app memory area (step S18). Specifically, image 610 showing "+1" which represents the number of times of kicking described with reference to FIG. 4 and a message image to be shown in representation area 620 are generated. The status of accomplishment of the objective set in the mission app memory area is reset after lapse of a prescribed period. Image 610 is thus erased after lapse of the prescribed period. The number of times of kicking shown in representation area 620 is set to 0.

Combination unit 205 then combines the generated image with the game image generated based on execution by execution unit 200 (step S19). Specifically, image 610 showing "+1" which represents the number of times of kicking described with reference to FIG. 4 is superimposed on the game image generated based on execution by execution unit 200 to generate game screen 600 combined with the message image shown in representation area 620.

Representation controller 206 then has the generated game screen shown on display 14 (step S20).

Accomplishment information transmitter 203 then performs communication processing (step S22). Details of communication processing will be described later.

Whether or not the game has ended is then determined (step S24).

When it is determined in step S24 that the game has ended (YES in step S24), the process ends (end).

When it is determined in step S24 that the game does not end (NO in step S24), the process returns to step S10 and processing continues.

When objective accomplishment determination unit 202 determines in step S14 that the status of accomplishment of the objective has not been established (NO in step S14), steps S16 to S20 are skipped and communication processing in step S22 is performed. The process thereafter is similar.

Figure 12A:
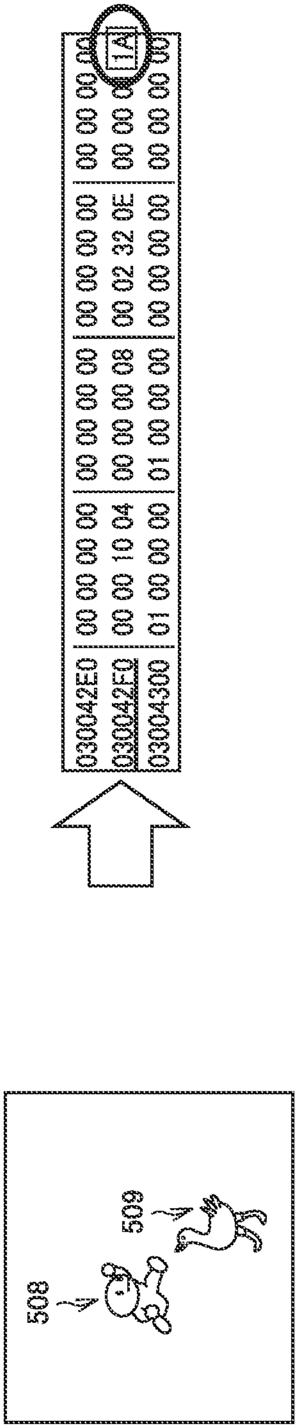
FIGS. 12A and 12B show exemplary illustrative non-limiting drawings illustrating a method of determining a status of accomplishment of an objective based on the embodiment.
Figure 12B:
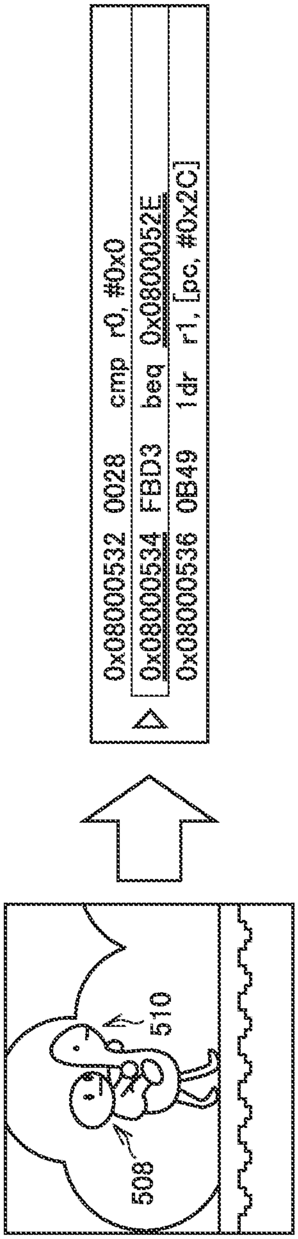

FIGS. 12A and 12B are diagrams illustrating a method of determining the status of accomplishment of the objective based on the embodiment.

Referring to FIG. 12A, in the present example, change in value at a prescribed address when player character 508 kicks enemy character 509 will be described.

In the present example, a prescribed address that changes in value on the occurrence of a prescribed event in the game is monitored. Specifically, the prescribed address that changes in value at the time of kicking by the player character which represents the prescribed event is monitored.

In the present example, the value at the prescribed address ("030042F0") in the emulator memory area is monitored. More specifically, an example in which a rightmost value changes from a value "00" to a value "1A" is shown.

As data in the emulator memory area resulting from execution of the emulation-target game is analyzed, association between kicking of the enemy character representing the prescribed event and change in value at the prescribed address can be identified.

The value at the prescribed address is reset or changes again in accordance with progress of the game.

Objective accomplishment monitoring unit 201 monitors the value at the prescribed address and informs objective accomplishment determination unit 202 of the value. Objective accomplishment determination unit 202 makes determination as to the status of accomplishment of the objective, that is, the status of kicking of enemy character 509 by player character 508, based on change in value.

Though change in value at the prescribed address at the time when player character 508 kicks enemy character 509 is described in the present example, determination as to a status of accomplishment of another objective can also be made.

For example, an example in which a state that player character 508 rides on a cooperative character 510 is determined as the status of accomplishment will be described.

Referring to FIG. 12B, in the present example, a state that player character 508 rides on cooperative character 510 is shown.

By way of example, an example in which a code to a prescribed address ("0x0800052E") shown far-right is set is shown.

As data in the emulator memory area which results from execution of the emulation-target game is analyzed, association between the state that player character 508 rides on cooperative character 510 which represents the prescribed event and the value at the prescribed address can be identified.

The value at the prescribed address is reset or changes again in accordance with progress of the game.

Objective accomplishment monitoring unit 201 monitors the value at the prescribed address and informs objective accomplishment determination unit 202 of the value. Objective accomplishment determination unit 202 can make determination as to the status of accomplishment of the objective, that is, the status that player character 508 rides on cooperative character 510, based on change in value.

Figure 13:
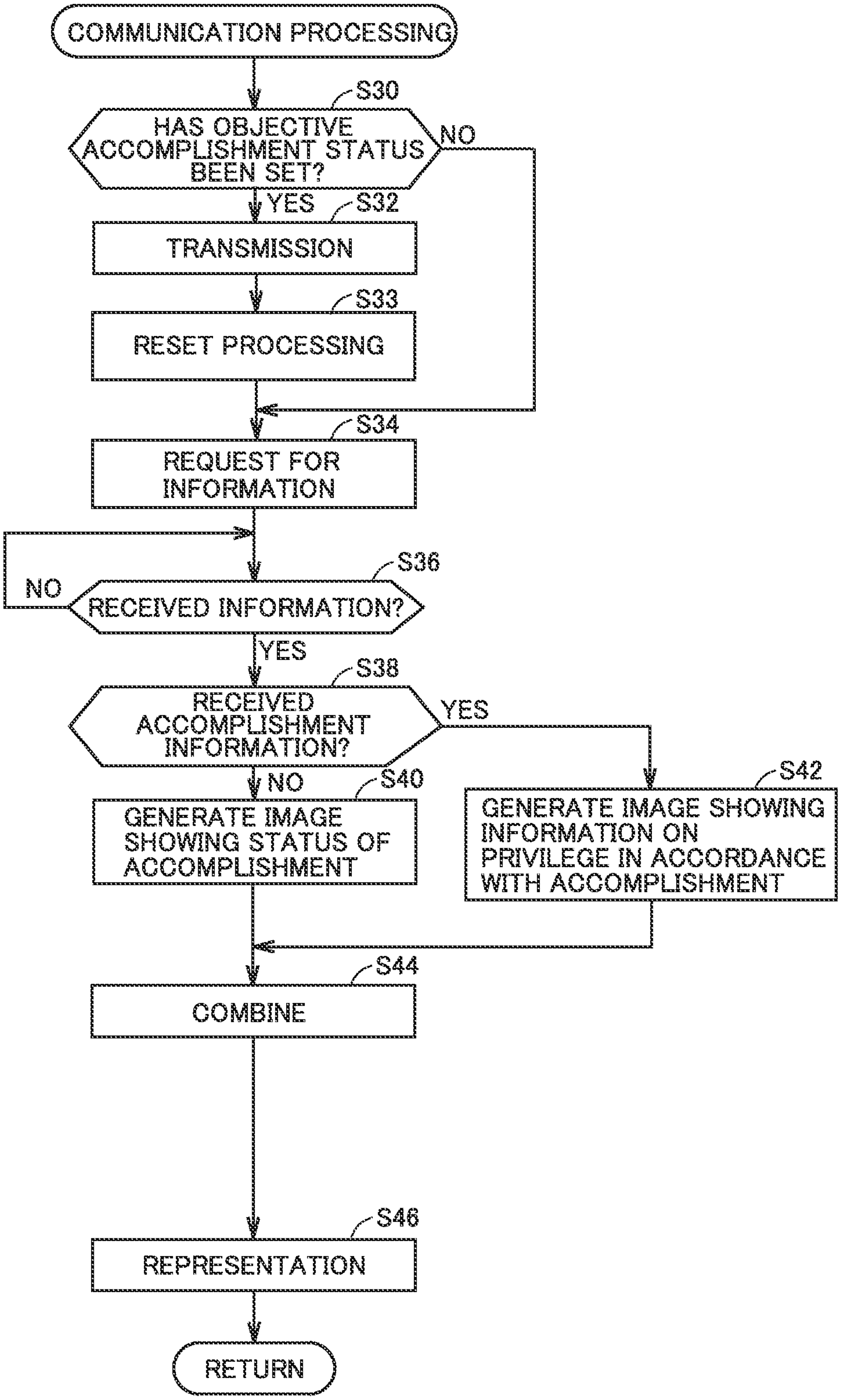
FIG. 13 shows an exemplary illustrative non-limiting flowchart illustrating communication processing in information processing apparatus 10A based on the embodiment.

FIG. 13 is a flowchart illustrating communication processing in information processing apparatus 10A based on the embodiment.

Referring to FIG. 13, accomplishment information transmitter 203 determines whether or not the status of accomplishment of the objective has been set in the mission app memory arca (step S30).

When accomplishment information transmitter 203 determines in step S30 that the status of accomplishment of the objective has been set in the mission app memory area, it transmits the set status of accomplishment of the objective to server 30 (step S32). For example, accomplishment information transmitter 203 transmits the set status of accomplishment of the objective to server 30, together with an apparatus ID and a country ID set in advance for identification of information processing apparatus 10A, in association with each other. By way of example, in the present example, the apparatus ID ("AAA") and the country ID ("JP") allocated to information processing apparatus 10A are transmitted to server 30 in association with the set status of accomplishment of the objective (the number of times of kicking (+1)).

Accomplishment information transmitter 203 then performs processing for resetting the status of accomplishment of the objective set in the mission app memory area (step S33).

Accomplishment information transmitter 203 then requests server 30 to give information on the status of accomplishment of the online mission (step S34). For example, accomplishment information transmitter 203 transmits to server 30, a command that requests the information, together with the apparatus ID and the country ID set in advance for identification of information processing apparatus 10A. By way of example, in the present example, the apparatus ID ("AAA") and the country ID ("JP") allocated to information processing apparatus 10A are transmitted to server 30 together with the command that requests the information.

When accomplishment information transmitter 203 determines in step S30 that the status of accomplishment of the objective has not been set in the mission app memory area (NO in step S30), steps S32 and S33 are skipped and the process proceeds to step S34.

Accomplishment information receiver 204 determines whether or not it has received information from server 30 (step S36).

The state in step S36 is maintained until accomplishment information receiver 204 receives information, and when accomplishment information receiver 204 receives the information in step S36 (YES in step S36), it determines whether or not it has received accomplishment information as information on the status of accomplishment of the online mission (step S38).

When accomplishment information receiver 204 determines in step S38 that it has received the accomplishment information as the information on the status of accomplishment of the online mission (YES in step S38), it instructs image generator 207 to generate an image for showing information on a privilege in accordance with accomplishment of the online mission included in the accomplishment information (step S42).

Combination unit 205 then combines the generated image with the game image generated based on execution by execution unit 200 (step S44). Specifically, game screen 700 resulting from combination of representation area 710 for showing information on the privilege in accordance with accomplishment of the online mission with the game image generated based on execution by execution unit 200 as described with reference to FIG. 5 is generated.

Representation controller 206 then has the generated game screen shown on display 14 (step S46).

Then, the process ends (return).

When accomplishment information receiver 204 determines in step S38 that it has not received the accomplishment information as the information on the status of accomplishment of the online mission (NO in step S38), it instructs image generator 207 to generate an image for showing the accomplishment status based on status information on the status of accomplishment of the online mission (step S40).

Combination unit 205 then combines the generated image with the game image generated based on execution by execution unit 200 (step S44). Specifically, game screen 600 resulting from combination of representation areas 630 to 650 for showing information indicating the status of accomplishment of the online mission with the game image generated based on execution by execution unit 200 as described with reference to FIG. 4 is generated.

Representation controller 206 then has the generated game screen shown on display 14 (step S46).

Then, the process ends (return).

Figure 14:
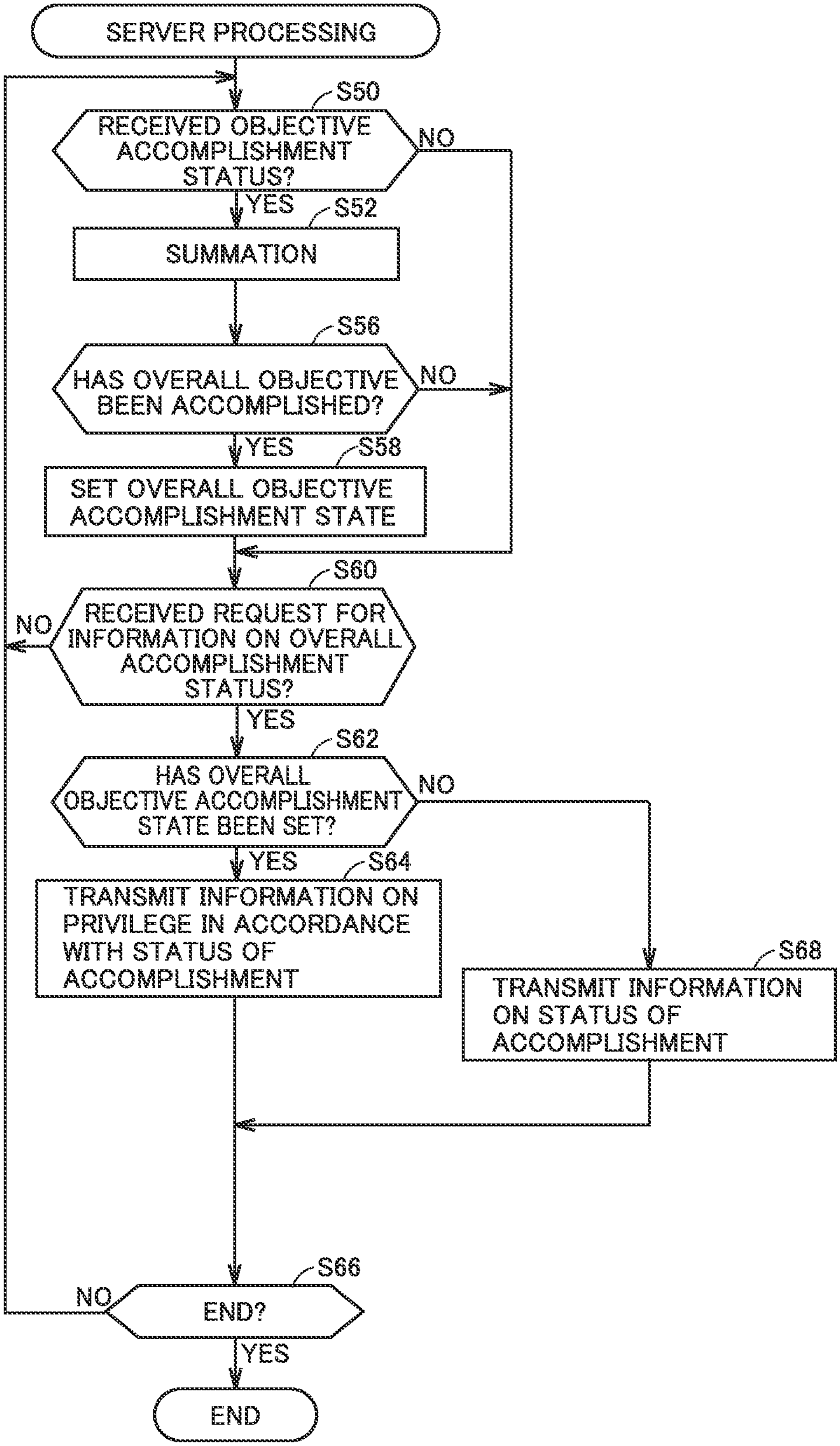
FIG. 14 shows an exemplary illustrative non-limiting flowchart illustrating processing in server 30 based on the embodiment.

FIG. 14 is a flowchart illustrating processing in server 30 based on the embodiment.

Referring to FIG. 14, CPU 120 of server 30 performs processing below by reading mission management program 150. Though processing between server 30 and information processing apparatus 10A is described in the present example, similar processing is performed also between server 30 and other information processing apparatuses 10B and 10C.

Receiver 300 determines whether or not it has received the status of accomplishment of the objective from information processing apparatus 10A (step S50).

When receiver 300 determines in step S50 that it has received the status of accomplishment of the objective from information processing apparatus 10A (YES in step S50), it provides data on the status of accomplishment of the objective to summation unit 302 and summation unit 302 sums the data (step S52). Specifically, summation unit 302 refers to a summation table which will be described later and updates an item allocated to information processing apparatus 10A (apparatus ID ("AAA")) in the summation table.

FIG. 15 is a diagram illustrating the summation table provided by summation unit 302 of server 30 based on the embodiment.

Referring to FIG. 15, the summation table is registered, with a region ID indicating a region to which an apparatus ID belongs, the number of times of mission (kicks), and ranking (rank) being associated with the apparatus ID in the present example.

Specifically, a country ID ("JP"), the number of times of mission ("7520"), and the ranking ("20") are registered in correspondence with the apparatus ID (AAA).

The country ID ("JP"), the number of times of mission ("2000"), and the ranking ("200") are registered in correspondence with an apparatus ID (BBB).

The country ID ("JP"), the number of times of mission ("4000"), and the ranking ("160") are registered in correspondence with an apparatus ID (CCC).

As the sum of the number of times of mission for each country ID, "102939" is registered.

As the sum of the number of times of mission all over the world, "1929802939" is registered.

Summation unit 302 updates the summation table each time it receives the status of accomplishment of the objective transmitted from each information processing apparatus.

For example, when the number of times of kicking (+1) is received as the status of accomplishment of the objective transmitted from the apparatus ID (AAA), the number of times of mission in the corresponding item is updated. The number of times of mission summed for each country ID and the number of times of mission all over the world are updated. Furthermore, the ranking is calculated based on the number of times and the value of the ranking is updated as necessary.

The processing continues until the online mission is accomplished.

Referring again to FIG. 14, overall objective accomplishment determination unit 303 then determines whether or not the online mission (overall objective) has been accomplished based on a result of summation (step S56). By way of example, overall objective accomplishment determination unit 303 determines whether or not the sum of the number of times of mission all over the world has reached one billion based on the result of the sum in the summation table.

When overall objective accomplishment determination unit 303 determines in step S56 that the online mission has been accomplished (YES in step S56), it sets an objective accomplishment state (step S58). By way of example, overall objective accomplishment determination unit 303 sets the objective accomplishment state at the time when the sum of the number of times of mission all over the world reaches one billion based on the result of summation in the summation table.

When receiver 300 determines in step S50 that it has not received the status of accomplishment of the objective from information processing apparatus 10A (NO in step S50), steps S52 to S58 are skipped and the process proceeds to step S60.

When overall objective accomplishment determination unit 303 determines in step S56 that the online mission has not been accomplished (NO in step S56), step S58 is skipped and the process proceeds to step S60.

In step S60, receiver 300 determines whether or not it has received a request for information on the status of accomplishment of the online mission from information processing apparatus 10A (step S60).

When receiver 300 determines in step S60 that it has received the request for information on the status of accomplishment of the online mission from information processing apparatus 10A (YES in step S60), it instructs transmitter 301 to determine whether or not overall objective accomplishment determination unit 303 has set the online mission to the objective accomplishment state (step S62).

When transmitter 301 determines in step S62 that the online mission has been set to the objective accomplishment state (YES in step S62), it transmits accomplishment information as information on the status of accomplishment of the online mission (step S64). Specifically, transmitter 301 transmits information on a privilege in accordance with accomplishment of the online mission as the accomplishment information. Specifically, the transmitter transmits data "congratulations on accomplishment of mission" and "reward of 10000 points." Transmitter 301 checks the ranking of information processing apparatus 10A. When the ranking is within a range of prescribed ranks (for example, in the top 50), transmitter 301 transmits data "rank twentieth among top players" and "reward of limited item," which represent ranking information.

Information processing apparatus 10A thus shows a screen in the case of accomplishment of the online mission in representation area 710 as described with reference to FIG. 5.

Whether or not to quit online mission processing is then determined (step S66).

When the online mission processing does not end in step S66 (NO in step S66), the process returns to step S50 and the processing above is repeated.

When the online mission processing ends in step S66 (YES in step S66), the process ends (end).

When transmitter 301 determines in step S62 that the online mission has not been set to the objective accomplishment state (NO in step S62), it transmits status information as information on the status of accomplishment of the online mission (step S68). Specifically, transmitter 301 transmits as the status information, data on the number of times of mission ("7520") and the ranking ("20") of information processing apparatus 10A corresponding to the apparatus ID. Transmitter 301 transmits as the status information, data "102939" as the sum of the number of times of mission for each country ID and data "1929802939" as the sum of the number of times of mission all over the world.

Information processing apparatus 10A thus shows in representation area 630 as described with reference to FIG. 4, information on the status of accomplishment based on the total number of times, of the objective which is the online mission by the player, as information on the status of accomplishment of the online mission. Information processing apparatus 10A shows in representation area 640 as described with reference to FIG. 4, information on the status of accomplishment for each region based on the total number of times, of the objective which is the online mission, as the information on the status of accomplishment of the online mission. Information processing apparatus 10A shows in representation area 650 as described with reference to FIG. 4, information on the status of accomplishment of the mission all over the world based on the total number of times, as the information on the status of accomplishment of the online mission.

The process then proceeds to step S66. Subsequent processing is similar.

When receiver 300 determines in step S60 that it has not received the request for information on the status of accomplishment of the online mission from information processing apparatus 10A (NO in step S60), the process returns to step S50 and the processing above is repeated.

F. Additional Aspect

Though the embodiment above describes an example in which objective accomplishment monitoring unit 201 determines a status of accomplishment of an objective (mission) based on presence/absence of change in value at the prescribed address when player character 508 has kicked enemy character 509 in a game, the embodiment is not particularly limited as such.

For example, when a plurality of stages are provided in a game, whether or not player character 508 has played through all stages may be defined as the mission. For example, objective accomplishment monitoring unit 201 monitors a value at a prescribed address corresponding to a name of a stage set for each stage and objective accomplishment determination unit 202 may determine a status of accomplishment of the objective (mission) based on whether or not the value at the prescribed address has changed to values corresponding to all stages. Alternatively, beating of a specific enemy character by the player character or acquisition of a specific item by the player character may be defined as the mission. For example, objective accomplishment monitoring unit 201 may monitor a value at a prescribed address corresponding to a specific enemy character or a specific item and objective accomplishment determination unit 202 may determine the status of accomplishment of the objective (mission) based on change in value at the prescribed address.

Change of player character 508 to a plurality of states in the game may be defined as the mission. For example, objective accomplishment monitoring unit 201 may monitor a value at a prescribed address that changes each time player character 508 changes to one of the plurality of states and objective accomplishment determination unit 202 may make determination as to the status of accomplishment of the objective (mission) based on whether or not the value at the prescribed address has changed a plurality of times (the number of times of change).

Occurrence of a specific event in the game may be defined as the mission, without being limited to player character 508. For example, objective accomplishment monitoring unit 201 may monitor a value at a prescribed address corresponding to a randomly occurring event and objective accomplishment determination unit 202 may make determination as to the status of accomplishment of the objective (mission) based on change in value at the prescribed address.

Player character 508 satisfying a specific condition in a specific state may be defined as the objective (mission). For example, beating of at least a prescribed number of enemy characters by invincible player character 508 may be defined as the objective (mission). Objective accomplishment monitoring unit 201 may monitor each of a value at a first prescribed address at which player character 508 changes to a specific state and a value at a second prescribed address at which the player character changes when it beats an enemy character, and objective accomplishment determination unit 202 may make determination as to the status of accomplishment of the objective (mission) based on whether or not the values at the first and second prescribed addresses satisfy a prescribed condition. Without being limited to the values at the first and second prescribed addresses, determination as to the status of accomplishment of the objective (mission) may be made based on a value at yet another address.

Determination as to the status of accomplishment of the objective (mission) may be made based on combination of a value at a prescribed address and a play time period. For example, objective accomplishment determination unit 202 may make determination as to the status of accomplishment of the objective (mission) based on whether or not a value at a prescribed address changes within a prescribed time period. Alternatively, determination as to the status of accomplishment of the objective (mission) may be made based on a value at a prescribed address at prescribed timing or a cumulative sum of values over a prescribed period. Without being limited to the play time period, determination as to the status of accomplishment of the objective (mission) may be made based on combination with another parameter. For example, a travel distance or a traveling speed of player character 508 may be calculated, and whether or not the calculated travel distance or the traveling speed is equal to or larger than a prescribed threshold value being combined as a condition, objective accomplishment determination unit 202 may make determination as to the status of accomplishment of the objective (mission) based thereon.

In the flowchart in FIG. 13, a configuration in which accomplishment information transmitter 203 transmits in step S32, the set status of accomplishment of the objective to server 30 and transmits in step S34, a request for information on the status of accomplishment of the online mission to server 30 is described. Without being limited as such, for example, with step S32 and step S34 being combined, accomplishment information transmitter 203 may transmit to server 30, the set status of accomplishment of the objective and a request for information on the status of accomplishment of the online mission.

Though an example in which information processing apparatuses 10A to 10C that participate in the online mission transmit to server 30, a request for information on the status of accomplishment of the online mission and they receive information on the status of accomplishment of the online mission from server 30 is described in the present example, without particularly being limited as such, another information processing apparatus 10 that has not participated in the online mission may issue a request for information on the status of accomplishment of the online mission and receive the information on the status of accomplishment of the online mission from server 30 in response to the request. A motivation to participate in the online mission can thus be given to a player of another information processing apparatus 10.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A non-transitory storage medium encoded with a computer readable game program executable by a computer of an information processing apparatus, when executed by the computer, the computer readable game program causes the computer to perform operations comprising:

causing an emulator to execute a game program;

monitoring a prescribed address in a memory area used as a result of execution of the game program by the emulator, the prescribed address changing in value on occurrence of a prescribed event in a game;

determining a status of accomplishment of an objective set in advance based on transition of the value at the prescribed address in the game;

transmitting the status of accomplishment of the objective to a server provided to communicate over a network; and receiving from the server, information on a status of accomplishment of an online mission, the status being determined based on the status of accomplishment of the objective transmitted by a plurality of players.

2. The non-transitory storage medium encoded with a computer readable game program according to claim 1, wherein the status of accomplishment of the objective is determined based on at least one of presence/absence of change during the game, the number of times of change, a value at prescribed timing, and a cumulative sum over a prescribed period, of the value at the prescribed address.

3. The non-transitory storage medium encoded with a computer readable game program according to claim 2, wherein the value at the prescribed address is reset or changes again in accordance with progress of the game.

4. The non-transitory storage medium encoded with a computer readable game program according to claim 3, wherein the value at the prescribed address changes when a player character performs a prescribed action in the game.

5. The non-transitory storage medium encoded with a computer readable game program according to claim 1, further causing the computer to generate and output a game screen resulting from superimposition of information on the status of accomplishment of the objective on a game image based on execution of the game program by the emulator when the value at the prescribed address changes.

6. The non-transitory storage medium encoded with a computer readable game program according to claim 1, further causing the computer to generate and output a game screen resulting from combination of a game image based on execution of the game program by the emulator and an image showing the status of accomplishment of the online mission obtained from the server.

7. A game system comprising:

a plurality of information processing apparatuses; and a server provided to communicate with the plurality of information processing apparatuses over a network, wherein each of the plurality of information processing apparatuses includes a computer configured to execute a computer-readable program, the computer executes a game program by means of an emulator distinct from the computer-readable program, the computer, when executing the computer-readable program:

monitors a prescribed address in a memory area used as a result of execution of the game program by the emulator, the prescribed address changing in value on occurrence of a prescribed event in a game, determines a status of accomplishment of an objective set in advance based on transition of the value at the prescribed address, and transmits the status of accomplishment to the server, and the server makes determination as to accomplishment of an online mission set for the plurality of information processing apparatuses based on the status of accomplishment of the objective transmitted from the plurality of information processing apparatuses, and transmits to the plurality of information processing apparatuses, information on a status of accomplishment of the online mission based on a result of determination.

8. The game system according to claim 7, wherein the status of accomplishment of the objective is determined based on at least one of presence/absence of change during the game, the number of times of change, a value at prescribed timing, and a cumulative sum over a prescribed period, of the value at the prescribed address.

9. The game system according to claim 8, wherein the value at the prescribed address is reset or changes again in accordance with progress of the game.

10. The game system according to claim 9, wherein the value at the prescribed address changes when a player character performs a prescribed action in the game.

11. The game system according to claim 7, wherein the computer further generates and outputs a game screen resulting from superimposition of information on the status of accomplishment of the objective on a game image based on execution of the game program by the emulator when the value at the prescribed address changes.

12. The game system according to claim 7, wherein the computer further generates and outputs a game screen resulting from combination of a game image based on execution of the game program by the emulator and an image showing the status of accomplishment of the online mission obtained from the server.

13. An information processing apparatus comprising:

a computer; and a memory storing a computer-readable program, wherein the computer executes a game program by means of an emulator distinct from the computer-readable program, the computer, when executing the computer-readable program, monitors a prescribed address in a memory area used as a result of execution of the game program by the emulator, the prescribed address changing in value on occurrence of a prescribed event in a game, determines a status of accomplishment of an objective set in advance based on transition of the value at the prescribed address in the game, transmits the status of accomplishment to a server provided to communicate over a network, and receives from the server, information on a status of accomplishment of an online mission, the status being determined based on the status of accomplishment of the objective transmitted by a plurality of players.

14. The information processing apparatus according to claim 13, wherein the status of accomplishment of the objective is determined based on at least one of presence/absence of change during the game, the number of times of change, a value at prescribed timing, and a cumulative sum over a prescribed period, of the value at the prescribed address.

15. The information processing apparatus according to claim 14, wherein the value at the prescribed address is reset or changes again in accordance with progress of the game.

16. The information processing apparatus according to claim 15, wherein the value at the prescribed address changes when a player character performs a prescribed action in the game.

17. The information processing apparatus according to claim 13, wherein the computer generates and outputs a game screen resulting from superimposition of information on the status of accomplishment of the objective on a game image based on execution of the game program by the emulator when the value at the prescribed address changes.

18. The information processing apparatus according to claim 13, wherein the computer generates and outputs a game screen resulting from combination of a game image based on execution of the game program by the emulator and an image showing the status of accomplishment of the online mission obtained from the server.

19. An information processing method comprising:

executing, by a processor of a game device, a game program by means of an emulator, monitoring, using another program, executed by a processor, a prescribed address in a memory area used as a result of execution of the game program by the emulator, the prescribed address changing in value on occurrence of a prescribed event in a game, determining, using the another program, executing by a processor, a status of accomplishment of an objective set in advance based on transition of the value at the prescribed address in the game, transmitting, using the another program, executing by a processor, the status of accomplishment to a server provided to communicate over a network, and receiving, using the another program, executing by a processor, from the server, information on a status of accomplishment of an online mission, the status being determined based on the status of accomplishment of the objective transmitted by a plurality of players.

20. The information processing method according to claim 19, wherein the processor determines the status of accomplishment of the objective set in advance for the game, based on at least one of presence/absence of change during the game, the number of times of change, a value at prescribed timing, and a cumulative sum over a prescribed period, of the value at the prescribed address.

21. The information processing method according to claim 20, wherein the value at the prescribed address is reset or changes again in accordance with progress of the game.

22. The information processing method according to claim 21, wherein the value at the prescribed address changes when a player character performs a prescribed action in the game.

23. The information processing method according to claim 19, further comprising:

generating and outputting, by the processor, a game screen resulting from superimposition of information on the status of accomplishment of the objective on a game image based on execution of the game program by the emulator when the value at the prescribed address changes.

24. The information processing method according to claim 19, further comprising:

generating and outputting, by the processor, a game screen resulting from combination of a game image based on execution of the game program by the emulator and an image showing the status of accomplishment of the online mission obtained from the server.

* * * * *